United States Patent
Lee et al.

(10) Patent No.: US 11,973,461 B2
(45) Date of Patent: Apr. 30, 2024

(54) SOLAR BOAT PANEL CLEANING DEVICE AND METHOD USING COMPRESSED CLEANING INFLOW WATER DURING BOAT OPERATION

(71) Applicant: K-MARINE CO., LTD., Gunsan-si (KR)

(72) Inventors: Chan Woo Lee, Iksan-si (KR); Hye Sook Jung, Iksan-si (KR)

(73) Assignee: K-MARINE CO., LTD., Gunsan-si (KR)

(*) Notice: Subject to any disclaimer, the term of this patent is extended or adjusted under 35 U.S.C. 154(b) by 175 days.

(21) Appl. No.: 17/535,891

(22) Filed: Nov. 26, 2021

(65) Prior Publication Data

US 2022/0345079 A1 Oct. 27, 2022

(30) Foreign Application Priority Data

Apr. 23, 2021 (KR) ........................ 10-2021-0052752

(51) Int. Cl.
| | | |
|---|---|---|
| *B08B 3/02* | (2006.01) | |
| *B08B 3/14* | (2006.01) | |
| *B63B 35/44* | (2006.01) | |
| *C02F 1/00* | (2023.01) | |
| *C02F 1/04* | (2023.01) | |
| *C02F 1/44* | (2023.01) | |

(Continued)

(52) U.S. Cl.
CPC ................ *H02S 40/10* (2014.12); *B08B 3/02* (2013.01); *B08B 3/14* (2013.01); *B63B 35/44* (2013.01); *C02F 1/001* (2013.01); *C02F 1/008* (2013.01); *C02F 1/04* (2013.01); *C02F 1/441* (2013.01); *C02F 1/66* (2013.01); *B63B 2035/4453* (2013.01); *C02F 2103/007* (2013.01); *C02F 2103/08* (2013.01); *C02F 2201/008* (2013.01); *C02F 2209/02* (2013.01); *C02F 2209/05* (2013.01); *C02F 2209/06* (2013.01); *C02F 2301/066* (2013.01)

(58) Field of Classification Search
CPC .. H02S 40/10; B08B 3/02; B08B 3/14; B63B 35/44; B63B 2035/4453; C02F 1/001; C02F 1/008; C02F 1/441; C02F 1/66; C02F 2103/007; C02F 2103/08; C02F 2201/008; C02F 2209/02; C02F 2209/05; C02F 2209/06; C02F 2301/066
USPC ........................................................ 134/109
See application file for complete search history.

(56) References Cited

U.S. PATENT DOCUMENTS

| | | | |
|---|---|---|---|
| 2013/0291923 A1* | 11/2013 | Kim .................... | B08B 3/08 136/244 |
| 2016/0065127 A1* | 3/2016 | Newdoll ................ | H02S 40/10 136/246 |

FOREIGN PATENT DOCUMENTS

KR 10-1330358 B1 11/2013

OTHER PUBLICATIONS

KR101330358B1—machine translation (Year: 2013).*

* cited by examiner

*Primary Examiner* — Tinsae B Ayalew
(74) *Attorney, Agent, or Firm* — Studebaker & Brackett PC

(57) ABSTRACT

Provided is a device and method of cleaning a solar panel of a solar boat using, as cleaning water, water externally introduced and compressed during operation of the solar boat. The device includes a water inlet port disposed on the front side of the solar boat, a filtration unit removing impurities from water introduced through the water inlet port during operation of the solar boat, a compression unit (Continued)

compressing impurities-removed water, and a spray nozzle spraying the compressed water to the solar panel.

6 Claims, 7 Drawing Sheets

(51) Int. Cl.
*C02F 1/66* (2023.01)
*H02S 40/10* (2014.01)
C02F 103/00 (2006.01)
C02F 103/08 (2006.01)

SOLAR BOAT PANEL CLEANING DEVICE AND METHOD USING COMPRESSED CLEANING INFLOW WATER DURING BOAT OPERATION

CROSS REFERENCE TO RELATED APPLICATION

The present application claims priority of Korean Patent Application No. 10-2021-0052752 filed on Apr. 23, 2021, the entire contents of which is incorporated herein for all purposes by this reference.

BACKGROUND OF THE INVENTION

Field of the Invention

The present disclosure relates to a device and method of cleaning a solar panel of a solar boat using, as cleaning water, inflow water introduced and compressed during operation of the solar boat, and more specifically, to a device and method of cleaning a solar panel of a solar boat using, as cleaning water, inflow water that is introduced through a front water inlet port and is compressed during operation of the solar boat so as to effectively clean the solar panel as well as to prevent an elevation in temperature of the solar panel, thereby improving power production efficiency, in order to solve a problem of reduction in the power production efficiency of a solar panel due to foreign substances such as yellow dust or dirt, which may be attached to the solar panel during operation of a solar boat.

Description of the Related Art

In the case of fossil fuels such as coal or petroleum, which are currently required for energy production, carbon dioxide emitted during the use thereof, are a major cause of global warming. In addition, fossil fuel combustion products, such as carbon monoxide, nitrogen oxides, sulfur oxides, etc., are becoming the cause of acid rain that harms human's health or destroys forests. Furthermore, there is a more fundamental problem that fossil fuels have limited reserves and may soon be depleted by indiscriminate use by human.

In order to solve this problem, it is required to develop new technologies for using natural energy that can reduce the consumption of fossil fuels to reduce the risk of global warming and can replace fossil fuels. As natural energy sources to replace fossil fuels, there are solar power generation, wind power generation, hydroelectric power generation, and the like. In particular, power generation using solar light is in the spotlight because it has a large reduction in greenhouse gas and is superior to other natural energy in terms of energy efficiency.

In general, solar power generation is a power generation method that directly converts light energy generated from the sun into electrical energy. Since solar light that is an energy source exists everywhere on the earth, there is no limit to the location, so the solar power generation has the advantage of being able to generate electricity in the required amount by installing the necessary facilities in the necessary places.

In addition, the solar power generation can have the advantages of being easily applied in various places due to the short period of building or construction, quickly responding to temporary increase in demand, and providing easy maintenance of solar power facilities to minimize the consumption of manpower.

Such solar power generation can be applied to various fields, and recently, even a solar boat has been emerged that performs solar power generation using a solar panel and moves over the water by using the generated electricity as a power. Such a solar boat is a boat designed to be activated by either electric power generated by and supplied from a solar panel installed on the roof of the boat, or an excess of electricity stored in a storage battery.

A solar panel that absorbs solar light in the solar power generation may be easily contaminated by foreign substances such as dust or yellow sand, and when contamination by foreign substances occurs, the amount of solar power generation may be reduced. Accordingly, efforts are being made to develop new technologies for cleaning the surface of a solar panel. The conventional method of cleaning a solar panel is made in a way that a cleaning solution is provided in advance, and when contamination occurs, the cleaning solution is applied to clean the solar panel. However, the conventional method of cleaning a solar panel is a method of cleaning a solar panel installed on land, so there is an aspect that is not suitable for application to a solar panel installed on a solar boat running on water.

Accordingly, the present inventors proposed a solar panel cleaning device and method that is easily applied to a solar panel installed on a solar boat to clean the solar panel using inflow water externally introduced and compressed during operation of the solar boat.

In this regard, as a solar panel cleaning-concerned related art technique, Korean Patent Registration No. 1330358 (Patent Document 1) has been disclosed.

Patent Document 1 relates to a cleaning and cooling system for a solar power generator, the system including: a rail unit installed at the highest position of a frame that is inclined so that a solar module is mounted in order to clean or cool the solar power generator; a bogie movably installed on the rail unit; a nozzle unit installed on the bogie to spray a cleaning solution and a cooling solution to the solar module to clean and cool the solar module; and a spray angle adjustment unit installed on one side of the nozzle unit to adjust an spray angle of the nozzle unit, and including an operation rod having one end connected to the nozzle unit, a support shaft rotatably supporting the center of the operation rod, a lift shaft connected to the other end of the operation rod to reciprocate the same in a vertical direction, and a second driving unit that reciprocates the lift shaft in the vertical direction, whereby the surface of the solar module can be cleaned and cooled at the same time.

However, in the solar panel concerned related art technique, including Patent Document 1, when dust accumulates on the surface of the solar module more than a set amount, the cleaning solution of the solar module is sprayed to clean the solar module, and when the temperature of the solar module is higher than the set temperature, the cooling solution is sprayed to cool the solar module so as to improve the power generation efficiency. Although such related art technique has the advantage of being able to substantially improving the cleaning efficiency and the cooling efficiency even through simultaneous performance of cleaning and cooling, there are still aspects that are not suitable for application to solar panels installed on solar boats running on water.

Information related to the R&D project supporting the present disclosure is as follows.

Department Name: Jeonbuk Saemangeum Industry-Academic Convergence Institute

Project Management (Professional) Institution Name: Jeonbuk Saemangeum Industry-Academic Convergence Institute Research Project Name: Jeollabuk-do shipbuilding equipment business diversification ecosystem establishment project Research Project Name: Development of a device and method of cleaning a solar panel of a solar boat using an externally introduced fluid Contribution Rate: 70%

Project performing Organization: K-Marine Co., Ltd.

Research Period: 04.16.2021-12.31.2021

RELATED ART DOCUMENT

Patent Document (Patent Document 1) Korean Patent Registration No. 1330358

SUMMARY OF THE INVENTION

Accordingly, the present disclosure has been made keeping in mind the above problems occurring in the related art, and an objective of the present disclosure is to provide a device and method of cleaning a solar panel of a solar boat using, as cleaning water, inflow water that is introduced through a water inlet port disposed on the front side of the solar boat and is compressed so as to provide suitable and efficient cleaning for the solar panel installed on the solar boat running on water, thereby improving power production efficiency of the solar panel.

In addition, another objective of the present disclosure is to provide a device and method of cleaning a solar panel of a solar boat using, as cleaning water, inflow water that is introduced and compressed during operation of the solar boat, whereby an opening/closing device that is opened only when cleaning is required is provided at a water inlet port to increase operating efficiency as well as to perform cleaning only if it is necessary, thereby improving the power production efficiency of the solar panel.

In addition, a further object of the present disclosure is to provide a device and method of cleaning a solar panel of a solar boat using, as cleaning water, inflow water that is introduced and compressed during operation of the solar boat, whereby a salinity measuring unit for measuring the salinity of water from which impurities have been removed and a salinity regulating unit for regulating the salinity of water from which impurities have been removed are provided in a filtration unit so that it is possible to perform cleaning during operation in both freshwater and seawater so as to improve the power production efficiency of the solar panel.

In addition, a further objective of the present disclosure is to provide a device and method of cleaning a solar panel of a solar boat using, as cleaning water, inflow water that is introduced and compressed during operation of the solar boat, whereby a pH measuring unit for measuring the pH of water from which impurities are removed and a pH regulating unit for regulating the pH of water from which impurities have been removed are provided in a filtration unit so that it is possible to easily clean the solar panel using neutral water so as to improve the power production efficiency of the solar panel.

In addition, a further objective of the present disclosure is to provide a device and method of cleaning a solar panel of a solar boat using, as cleaning water, inflow water that is introduced and compressed during operation of the solar boat, whereby a temperature measuring unit for measuring the temperature of the compressed water and a temperature regulating unit for regulating the temperature of the compressed water are provided in a compression unit so that the temperature of the cleaning water is regulated and an increase in the temperature of the solar panel is prevented according to the ambient temperature so as to improve the power production efficiency of the solar panel.

Further, a further objective of the present disclosure is to provide a device and method of cleaning a solar panel of a solar boat using, as cleaning water, inflow water that is introduced and compressed during operation of the solar boat, whereby a pollution measuring unit for measuring the pollution level is installed on the solar panel, and a compression regulating unit for regulating the degree of compression according to the measured pollution level is installed on a compression unit so that efficient cleaning is performed according to the pollution level of the solar panel so as to improve the power production efficiency of the solar panel.

According to an aspect of the present disclosure, there is provided a device for cleaning a solar panel of a solar boat using, as cleaning water, water externally introduced and compressed during operation of the solar boat, the device includes: a water inlet port disposed on the front side of the solar boat; a filtration unit removing impurities from water introduced through the water inlet port during operation of the solar boat; a compression unit compressing impurities-removed water; and a spray nozzle spraying the compressed water to the solar panel.

In this case, preferably, the water inlet port is further provided with an opening/closing unit that is opened only when cleaning is required.

In this case, preferably, the filtration unit further includes a salinity measuring unit measuring the salinity of the impurities-removed water, and a salinity regulating unit regulating the salinity of the impurities-removed water.

In this case, preferably, the filtration unit further includes a pH measuring unit measuring the pH of the impurities-removed water, and a pH regulating unit regulating the pH of the impurities-removed water.

In this case, preferably, the compression unit further includes a temperature measuring unit measuring the temperature of the compressed water, and a temperature regulating unit regulating the temperature of the compressed water.

In this case, preferably, the solar panel further includes a pollution measuring unit measuring the pollution level, and the compression unit further includes a compression regulating unit regulating the degree of compression according to the measured pollution level.

In this case, preferably, the solar panel has a downward slope formed in the direction in which the spray nozzle sprays compressed water.

According to another aspect of the present disclosure, there is provided a method of cleaning a solar panel of a solar boat using, as cleaning water, water externally introduced and compressed during operation of the solar boat, the method includes: starting the operation of the solar boat; introducing water through a water inlet port disposed on the front side of the solar boat; removing impurities from the water introduced through the water inlet port during operation of the solar boat by using a filtration unit; compressing the impurities-removed water using a compression unit; and spraying the compressed water to the solar panel through the spray nozzle.

In this case, preferably, the method further includes, after removing the impurities, one or more of steps including: measuring the salinity of the impurities-removed water using a salinity measuring unit and regulating the salinity of the impurities-removed water using a salinity regulating unit; and measuring the pH of the impurities-removed water using a pH measuring unit and regulating the pH of the impurities-removed water using a pH regulating unit.

In this case, preferably, the method further includes, after the compressing using the compression unit, one or more of steps including: measuring the temperature of the compressed water using a temperature measuring unit and regulating the temperature of the compressed water using a temperature regulating unit; and measuring the pollution level of the solar panel using a pollution measuring unit and regulating the degree of compression using a compression regulating unit according to the pollution level.

In the device and method of cleaning a solar panel of a solar boat, inflow water that is introduced through a water inlet port disposed on the front side of the solar boat and is compressed is used as cleaning water so as to provide suitable and efficient cleaning for the solar panel installed on the solar boat running on water, thereby improving power production efficiency of the solar panel.

In addition, in the device and method of cleaning a solar panel of a solar boat using, as cleaning water, inflow water that is introduced and compressed during operation of the solar boat, the opening/closing device that is opened only when cleaning is required is provided at the water inlet port to increase operating efficiency as well as to perform cleaning only if it is necessary, thereby improving the power production efficiency of the solar panel.

In addition, in the device and method of cleaning a solar panel of a solar boat using, as cleaning water, inflow water that is introduced and compressed during operation of the solar boat, the salinity measuring unit for measuring the salinity of water from which impurities have been removed and the salinity regulating unit for regulating the salinity of water from which impurities have been removed are provided in the filtration unit so that it is possible to perform cleaning during operation in both freshwater and seawater so as to improve the power production efficiency of the solar panel.

In addition, in the device and method of cleaning a solar panel of a solar boat using, as cleaning water, inflow water that is introduced and compressed during operation of the solar boat, the pH measuring unit for measuring the pH of water from which impurities are removed and the pH regulating unit for regulating the pH of water from which impurities have been removed are provided in the filtration unit so that it is possible to easily clean the solar panel using neutral water so as to improve the power production efficiency of the solar panel.

In addition, in the device and method of cleaning a solar panel of a solar boat using, as cleaning water, inflow water that is introduced and compressed during operation of the solar boat, the temperature measuring unit for measuring the temperature of the compressed water and the temperature regulating unit for regulating the temperature of the compressed water are provided in the compression unit so that the temperature of the cleaning water is regulated and an increase in the temperature of the solar panel is prevented according to the ambient temperature so as to improve the power production efficiency of the solar panel.

Further, in the device and method of cleaning a solar panel of a solar boat using, as cleaning water, inflow water that is introduced and compressed during operation of the solar boat, the pollution measuring unit for measuring the pollution level is installed on the solar panel, and the compression regulating unit for regulating the degree of compression according to the measured pollution level is installed on the compression unit so that efficient cleaning is performed according to the pollution level of the solar panel so as to improve the power production efficiency of the solar panel.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

In the present disclosure, the accompanying drawings may be shown in exaggerated expression for the convenience of understanding the technology, and for differentiation and clarity from the related art. In addition, the terms to be described later are terms that are defined in consideration of the functions in the present disclosure and may vary depending on the user's or operator's intention or practices, so definitions of these terms should be made based on the technical content throughout this specification. On the other hand, the embodiments are merely exemplary matters of the components presented in the claims of the present disclosure, so they do not limit the scope of the present disclosure, and the scope of the rights should be interpreted based on the technical idea throughout the specification of the present disclosure.

Furthermore, prior to describing the present disclosure, it is noted that the configurations that are not required to reveal the gist of the present disclosure, i.e., well-known configurations that can be obviously added by those of ordinary skill in the art are not illustrated or specifically described.

Figure 1:
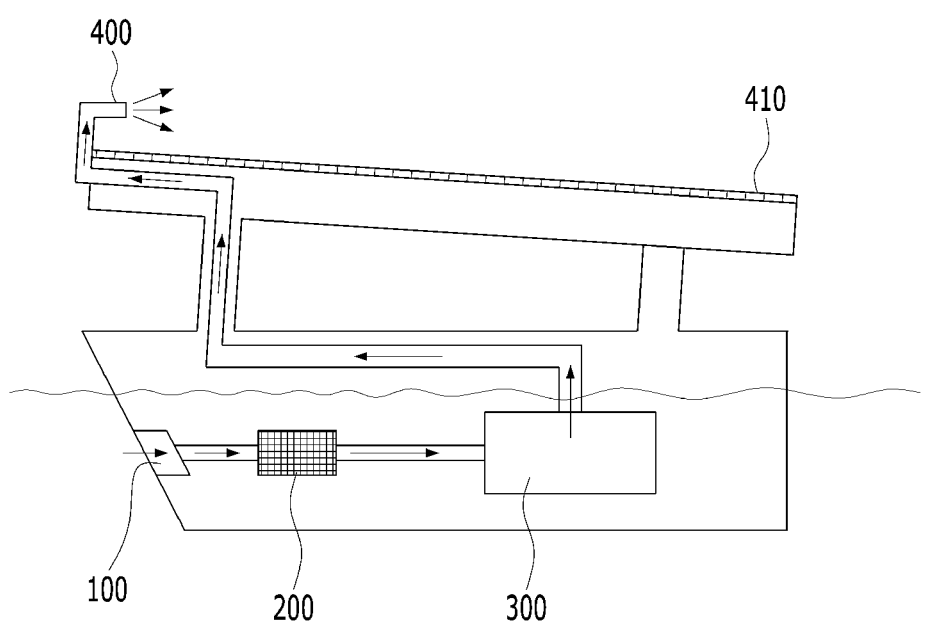
FIG. 1 is a view illustrating the configuration of a solar boat panel cleaning device configured to compress water introduced during operation to use the compressed water as cleaning water according to an embodiment of the present disclosure.

FIG. 1 is a view illustrating the configuration of a solar boat panel cleaning device configured to compress water introduced during operation to use the compressed water as cleaning water according to an embodiment of the present disclosure.

Referring to FIG. 1, the solar panel cleaning device includes a water inlet port 100 that is disposed on the front side of a solar boat, a filtration unit 200 that removes impurities from water introduced during operation of the solar boat through the water inlet port 100, a compression unit 300 that compresses the impurities-removed water, and a spray nozzle 400 that sprays the compressed water to the solar panel.

In the solar panel cleaning device according to an embodiment of the present invention, the water inlet port 100 is required to be disposed on the front side of the solar boat. Since the water inlet port 100 is disposed on the front side of the solar boat, seawater or freshwater may be introduced into the interior of the solar boat through the water inlet port 100 during operation of the solar boat without a separate suction device. There is no particular limitation on the shape of the water inlet port 100.

The solar panel cleaning device according to an embodiment of the present disclosure essentially includes the filtration unit 200 for removing impurities from the water introduced into the interior of the solar boat through the water inlet port 100 during operation of the solar boat. A solar boat equipped with the solar panel cleaning device according to the embodiment of the present disclosure may be operated in various areas, such as an area where a lot of impurities are present due to severe pollution. When a solar boat navigates the polluted area where impurities are present a lot, if the cleaning device do not include the filtration unit 200, the solar panel 410 may be contaminated in the cleaning process due to cleaning by contaminated water. In some cases, the filtration unit 200 may include a particle size detection unit to identify the particle size of impurities present in the water introduced into the solar boat through the water inlet port 100 so as to provide customized filtration. Customized filtration can be provided such that when the impurity particle size is large, the particle size that can pass through the filtration unit 200 is increased, and when the impurity particle size is small, the particle size that can pass through the filtration unit 200 is decreased. Through this customized filtration, the speed of water passing through the filtration unit 200 can be regulated, and the filtration efficiency can be properly maintained.

The solar panel cleaning device according to an embodiment of the present disclosure essentially includes a compression unit 300 for compressing impurities-removed water. A pressure of 5 bar to 200 bar may be applied to the water by the compression unit 300. If the pressure applied to the water is less than 5 bar, a problem may occur in that the spraying is not performed properly from the spray nozzle 400. In addition, if the pressure exceeds 200 bar, there may be a problem in that the solar panel 410 is damaged. In general, when the degree of pollution in the solar panel 410 is large, the pressure applied to the water is increased, and when the degree of pollution is small, the pressure applied to the water is decreased. When the degree of pollution in the solar panel 410 is small and the need for cooling the solar panel 410 is large, a pressure of 5 bar may be applied, and the cooling of the solar panel 410 may proceed in such a way that the spray nozzle 400 is sprayed in the air so that the sprayed water falls on the solar panel, rather than directly sprayed onto the solar panel 410.

The solar panel cleaning device according to an embodiment of the present disclosure essentially includes a spray nozzle 400 for spraying compressed water onto the solar panel 410. By spraying water at a pressure of 5 bar to 200 bar onto the solar panel 410 from the spray nozzle 400, the solar panel 410 may be cleaned. In this case, the spray nozzle 400 is attached to the front side of the solar panel 410 so as to directly or indirectly spray water at a pressure of 5 bar to 200 bar from the front to the rear of the solar panel 410, thereby cleaning and cooling the solar panel 410. In addition, the spray nozzle 400 is attached to the center of the solar panel 410 so as to directly or indirectly spray water at a pressure of 5 bar to 200 bar from the center to the left and right sides of the solar panel 410, thereby cleaning and cooling the solar panel 410. There is no particular limitation on the type of the solar panel 410, so any means for converting sunlight into electric current may correspond to the solar panel 410.

Figure 2:
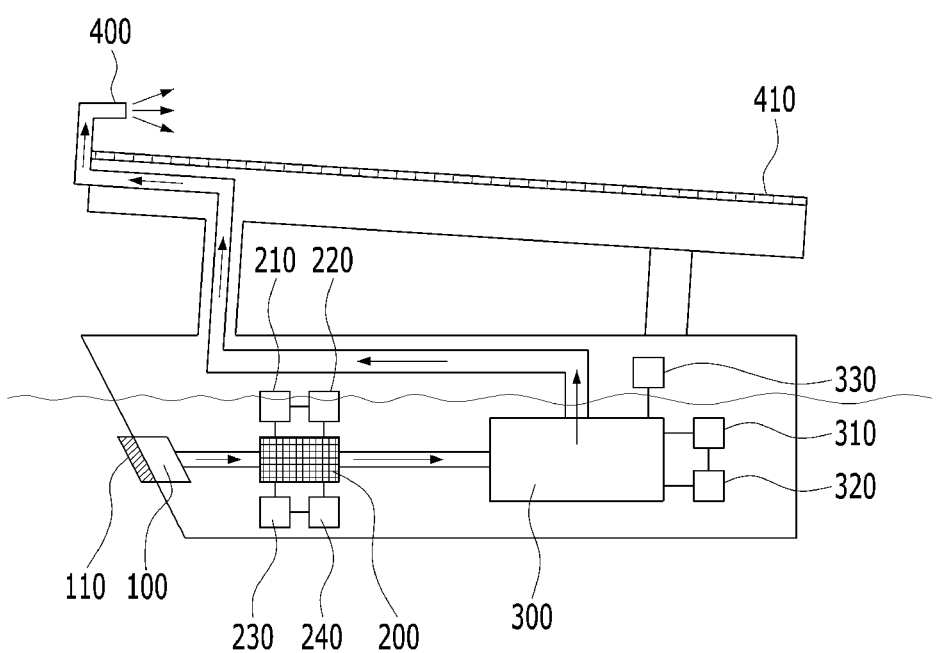
FIG. 2 is a view illustrating an additional configuration in the solar boat panel cleaning device configured to compress water introduced during operation to use the compressed water as cleaning water according to an embodiment of the present disclosure.

FIG. 2 is a view illustrating an additional configuration in the solar boat panel cleaning device configured to compress water introduced during operation to use the compressed water as cleaning water according to an embodiment of the present disclosure.

Referring to FIG. 2, in the solar panel cleaning device according to an embodiment of the present disclosure, the water inlet port 100 may be further provided with an opening/closing unit 110 that is opened only when cleaning is required. When the cleaning of the solar panel 410 is not required during the operation of the solar boat, the water inlet port 100 is closed by the opening/closing unit 110 to reduce the resistance during operation of the solar boat, and when the cleaning of the solar panel 410 is required during the operation of the solar boat, the water inlet port 100 is opened by the opening/closing unit 110 so that seawater or freshwater may be introduced into the solar boat through the water inlet port 100 during the operation of the solar boat.

Referring to FIG. 2, in the solar panel cleaning device according to an embodiment of the present disclosure, the filtration unit 200 may further include a salinity measuring unit 210 for measuring the salinity of water from which impurities have been removed and a salinity regulating unit 220 for regulating the salinity of water from which impurities have been removed. When the solar boat operates in the sea or in a river close to the sea, salt (NaCl) may be present in the water introduced into the interior of the solar boat through the water inlet port 100, and during cleaning the solar panel with salt (NaCl)—contained water, salt crystals may be produced on the solar panel 410. When salt crystals are produced on the solar panel 410, there may be a problem in the power production efficiency of the solar panel 410. This problem can be solved by measuring the salinity of the impurities-removed water using the salinity measuring unit 210 and regulating the salinity of the impurities-removed water using the salinity regulating unit 220 according to the present disclosure. There is no particular limitation on the type of the salinity measuring unit 210, so any means capable of measuring the salinity of the water introduced and impurities-removed in the solar boat may correspond to the salinity measuring unit 210. In addition, there is no particular limitation on the type of the salinity regulating unit 220, so any means capable of regulating the salinity of water introduced and impurities-removed in the solar boat may correspond to the salinity regulating unit 220. In general, the salinity regulating unit 220 may perform a process of desalination of water having salinity, using a distillation method or a reverse osmosis method. The distillation method refers to a method of obtaining salt-removed water by heating and evaporating salt water, then cooling and condensing the steam. The reverse osmosis method refers to a method of obtaining salt-removed water by pressurizing high-concentration salt water so that low-concentration salt-free water is moved through a reverse osmotic membrane.

Referring to FIG. 2, in the solar panel cleaning device to an embodiment of the present disclosure, the filtration unit 200 may further include a pH measuring unit 230 for measuring the pH of impurities-removed water and a pH regulating unit 240 for regulating the pH of the impurities-removed water. When the solar boat operates in the sea, river or lake, the water introduced into the interior of the solar boat through the water inlet port 100 may have acidic or basic properties, and when the solar panel is cleaned with water having acidic or basic properties, the solar panel 410 may be damaged. When the solar panel 410 is damaged, there may be a problem in the power production efficiency of the solar panel. This problem can be solved by measuring the pH of the impurities-removed water using the pH measuring unit 230 and regulating the pH of the impurities-removed water using the pH regulating unit 240 according to the present disclosure. There is no particular limitation on the type of the pH measuring unit 230, so any means capable of measuring the pH of the water introduced and impurities-removed in the solar boat may correspond to the pH measuring unit 230. In addition, there is no particular limitation on the type of the pH regulating unit 240, so any means capable of regulating the pH of the water introduced and impurities-removed in the solar boat may correspond to the pH regulating unit 240.

Referring to FIG. 2, in the solar panel cleaning device according to an embodiment of the present disclosure, the compression unit 300 may further include a temperature measuring unit 310 for measuring the temperature of compressed water and a temperature regulating unit 320 for regulating the temperature of the compressed water. When the solar boat operates in a tropical or temperate region, the temperature of the solar panel 410 is highly likely to increase and a problem may occur in the power production efficiency of the solar panel 410. Therefore, this problem can be solved by measuring the temperature of the water that is introduced into the solar boat through the water inlet port 100 and then is compressed, using the temperature measuring unit 310, to determine the possibility of an increase in temperature of the solar panel 410, and if the temperature of the solar panel 410 is high because the temperature of the compressed water is high, lowering the temperature of the compressed water using the temperature regulating unit 320, and cleaning the solar panel 410 using the temperature-lowered water to lower the temperature of the solar panel 410. There is no particular limitation on the type of the temperature measuring unit 310, so any means capable of measuring the temperature of the introduced and impurities-removed in the solar boat may correspond to the temperature measuring unit 310. There is no particular limitation on the type of the temperature regulating unit 320, so any means capable of regulating the temperature of the water introduced and impurities-removed in the solar boat may correspond to the temperature regulating unit 320.

Referring to FIG. 2, in the solar panel cleaning device according to an embodiment of the present disclosure, the solar panel 410 may further include a pollution measuring unit 420 for measuring a pollution level. The compression unit 300 may further include a compression regulating unit 330 for regulating the degree of compression according to the pollution level. In a case in which solar panel 410 is severely polluted as the solar boat has cruised through a highly polluted area, when the pressure of water sprayed from the spray nozzle 400 is low, it is impossible to provide suitable and efficient cleaning to the solar panel 410, and thus the power production efficiency of the solar panel may be disadvantageously reduced. Thus, the pollution measuring unit 420 measures and determines the pollution level of the solar panel 410. When the pollution level of the solar panel 410 is high, the compression regulating unit 330 increases the degree of compression in the compression unit 300. When the pollution level of the solar panel 410 is low, the compression regulating unit 330 reduces the degree of compression in the compression unit 300. In this manner, it is possible to provide suitable and efficient cleaning for the solar panel 410 and overcome the problem of reduced power production efficiency. Types of the pollution measuring unit 420 are not specifically limited, and any device configured to measure a pollution level outside the solar panel 410 may be employed as the pollution measuring unit 420. Types of the compression regulating unit 330 are also not specifically limited, and any device configured to regulate the pressure of water, which has been introduced into the solar boat, and from which impurities are removed, may be employed as the compression regulating unit 330.

Referring to FIG. 2, in the solar panel cleaning device according to an embodiment of the present disclosure, the solar panel 410 may have a downward inclination in the direction in which compressed water is sprayed. In a case in which the spray nozzle 400 is attached to the front region of the solar panel 410 to spray water from the front region to the rear region of the solar panel 410, the solar panel 410 may have a downward inclination in the front to rear direction. Water sprayed from the spray nozzle 400 may flow from the front region to the rear region due to the downward inclination in the front to rear direction so as to naturally drain. In a case in which the spray nozzle 400 is attached to the central portion of the solar panel 410 to spray water from the central portion of the solar panel 410 to the left region and the right region, the solar panel 410 may have downward inclinations from the central portion to the left region and the right region. Water sprayed from the spray nozzle 400 may flow from the central portion to the left region and the right region due to the downward inclinations from the central portion to the left region and the right region so as to naturally drain.

Figure 3:
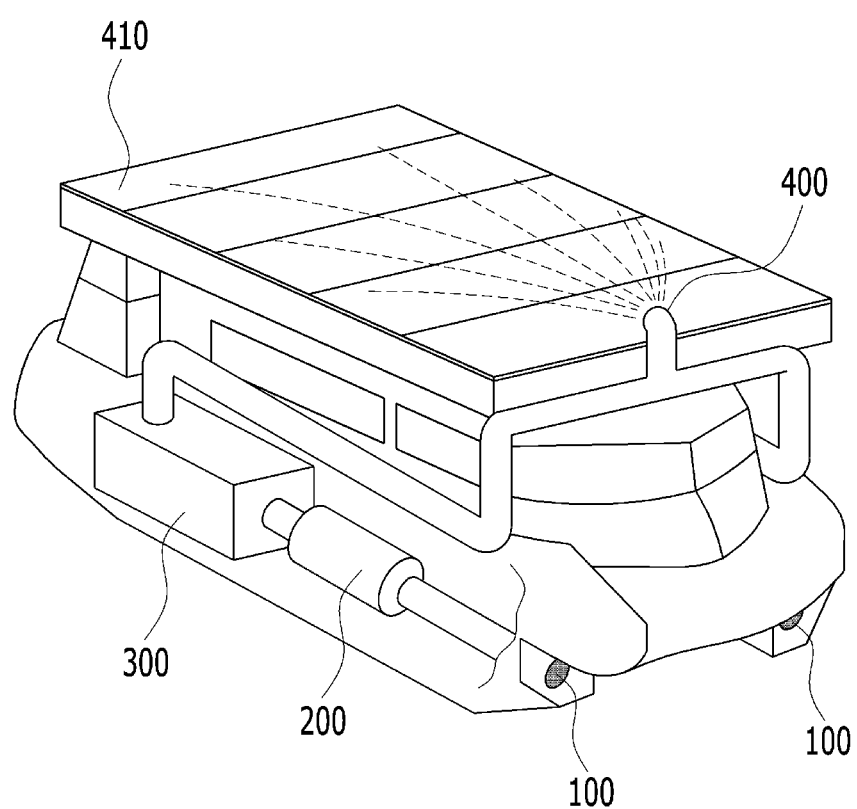
FIG. 3 is a view illustrating provision of the solar boat panel cleaning device configured to compress water introduced during operation to use the compressed water as cleaning water according to an embodiment of the present disclosure, in which the cleaning water is sprayed from the front region to the rear region of the solar panel.

FIG. 3 is a view illustrating provision of the solar boat panel cleaning device configured to compress water introduced during operation to use the compressed water as cleaning water according to an embodiment of the present disclosure, in which the cleaning water is sprayed from the front region to the rear region of the solar panel.

Referring to FIG. 3, in the solar boat panel cleaning device configured to compress water introduced during operation to use the compressed water as cleaning water according to an embodiment of the present disclosure, the spray nozzle 400 may be attached to the front region of the solar panel 410. The spray nozzle 400 may directly spray high-pressure compressed water onto the solar panel 410, in the direction from the front region to the rear region of the solar panel 410, so as to effectively remove severe contaminants present on the solar panel 410 and effectively control a temperature rise that may temporarily occur in the solar panel 410. In some cases, in the solar boat panel cleaning device configured to compress water introduced during operation to use the compressed water as cleaning water according to an embodiment of the present disclosure, the spray nozzle 400 may be attached to the front region of the solar panel 410. The spray nozzle 400 indirectly sprays the compressed water to the solar panel 410 by spraying the compressed water from the front region to above the rear region so that the water sprayed above the rear region of the solar panel 410 freely falls. In this manner, it is possible to effectively remove weak contaminants present on the solar panel 410 and effectively control a temperature rise that may temporarily occur in the solar panel 410.

Figure 4:
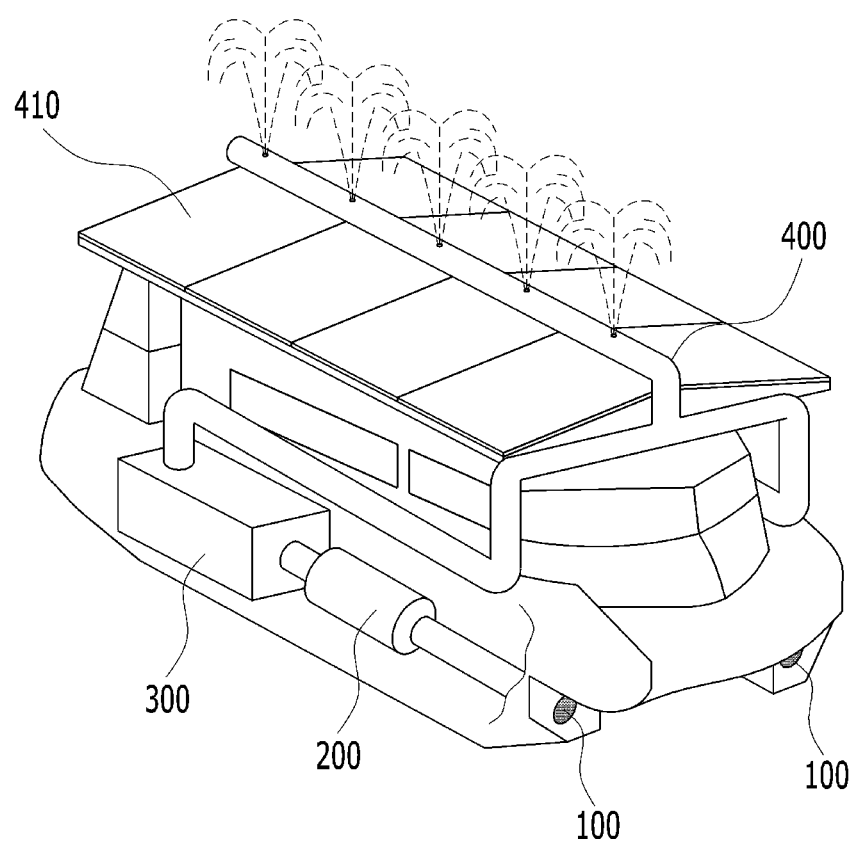
FIG. 4 is a view illustrating provision of the solar boat panel cleaning device configured to compress water introduced during operation to use the compressed water as cleaning water according to an embodiment of the present disclosure, in which the cleaning water is sprayed upward from the central portion of the solar panel and falls toward the solar panel.

FIG. 4 is a view illustrating provision of the solar boat panel cleaning device configured to compress water introduced during operation to use the compressed water as cleaning water according to an embodiment of the present disclosure, in which the cleaning water is sprayed upward from the central portion of the solar panel and falls toward the solar panel.

Referring to FIG. 4, in the solar boat panel cleaning device configured to compress water introduced during operation to use the compressed water as cleaning water according to an embodiment of the present disclosure, the spray nozzle 400 may be attached to the central portion of the solar panel 410. The spray nozzle 400 indirectly sprays the compressed water to the solar panel 410 by spraying the compressed water upward from the central portion of the solar panel 410 so that the sprayed water freely falls to the left region and the right region of the solar panel 410. In this manner, it is possible to effectively remove weak contaminants present on the solar panel 410 and effectively control a temperature rise that may temporarily occur in the solar panel 410. In some cases, in the solar boat panel cleaning device configured to compress water introduced during operation to use the compressed water as cleaning water according to an embodiment of the present disclosure, the spray nozzle 400 may be attached to the central portion of the solar panel 410 to directly spray compressed water from the center to the left and the right. In this manner, it is possible to effectively remove weak contaminants present on the solar panel 410 and effectively control a temperature rise that may temporarily occur in the solar panel 410.

Figure 5:
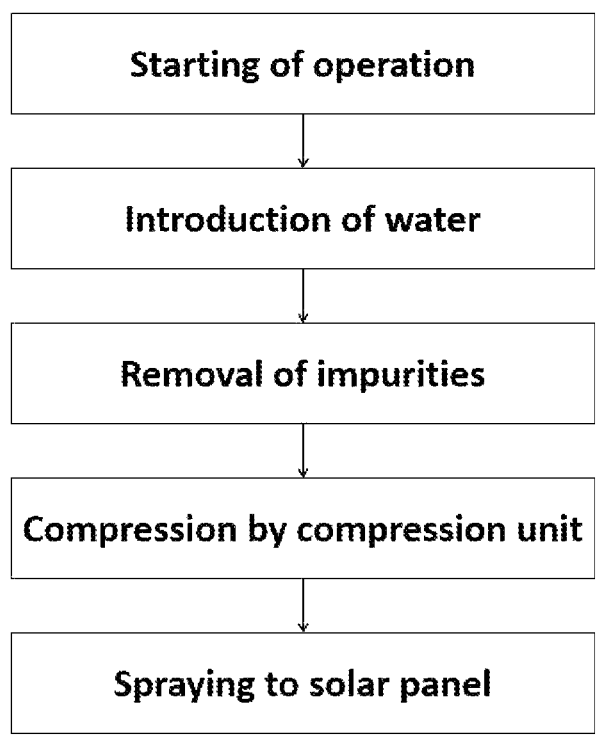
FIG. 5 is a flowchart illustrating a solar boat panel cleaning method that compresses water introduced during operation to use the compressed water as cleaning water according to an embodiment of the present disclosure.

FIG. 5 is a flowchart illustrating a solar boat panel cleaning method that compresses water introduced during operation to use the compressed water as cleaning water according to an embodiment of the present disclosure.

Referring to FIG. 5, in the solar boat panel cleaning method that compresses water introduced during operation to use the compressed water as cleaning water according to an embodiment of the present disclosure, the method includes: a start step in which the solar boat starts operation; a step in which water is introduced through a water inlet disposed in the front portion of the solar boat; a step of removing impurities from the water introduced through the water inlet during operation using a filter unit; a step of compressing the water from which impurities are removed; and a step of spraying the compressed water to the solar panel using the spray nozzle. When the solar boat starts operation, water is naturally introduced through a water inlet 100 disposed in the front portion of the solar boat. Impurities are removed from the water introduced through the water inlet 100 during operation using a filter unit 200. The water, from which impurities are removed, is compressed to 5 bars to 200 bars using the compression unit 300. For weak contaminants present on the solar panel 410 and a temperature rise that may temporarily occur, water compressed to 5 bars to 10 bars is directly or indirectly sprayed to the solar panel 410 using the spray nozzle 400. For strong contaminants present on the solar panel 410, water compressed to 100 bars to 200 bars is directly sprayed to the solar panel 410 using the spray nozzle 400.

Figure 6:
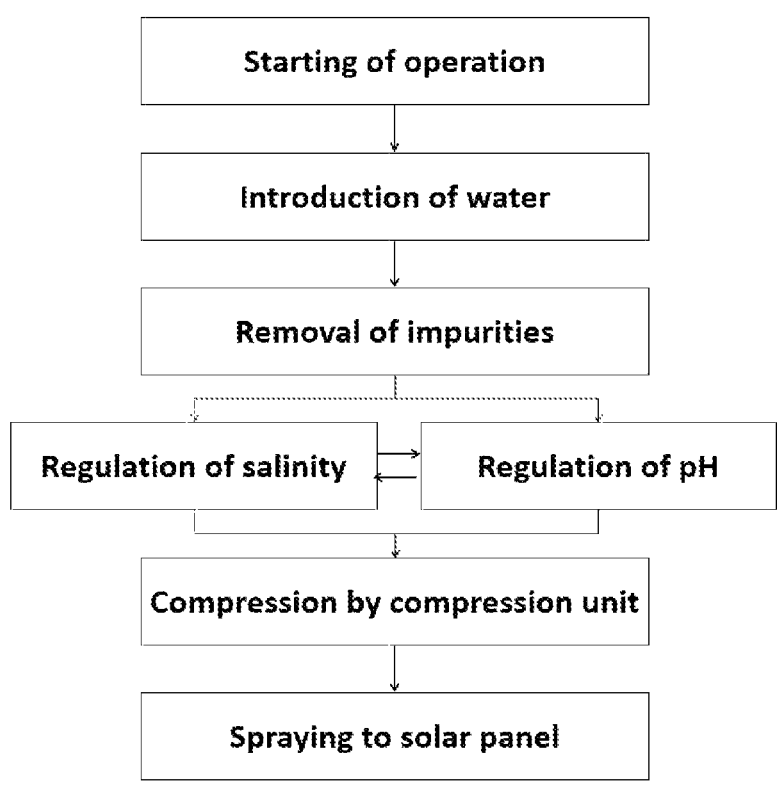
FIG. 6 is a flowchart illustrating a solar boat panel cleaning method that compresses water introduced during operation to use the compressed water as cleaning water, the method further including one or more of a salinity regulating step and a pH regulating step, according to an embodiment of the present disclosure.

FIG. 6 is a flowchart illustrating a solar boat panel cleaning method that compresses water introduced during operation to use the compressed water as cleaning water, the method further including one or more of a salinity regulating step and a pH regulating step, according to an embodiment of the present disclosure.

Referring to FIG. 6, in the solar boat panel cleaning method that compresses water introduced during operation to use the compressed water as cleaning water according to an embodiment of the present disclosure, a step in which the salinity of the water from which impurities are removed is measured by the salinity measuring unit 210 and regulated by the salinity regulating unit 220 may additionally be included between the impurity removal step and the compression step using the compression unit 300. In addition, referring to FIG. 6, in the solar boat panel cleaning method that compresses water introduced during operation to use the compressed water as cleaning water according to an embodiment of the present disclosure, a step in which the pH of the water from which impurities are removed is measured by the pH measuring unit 230 and regulated by the pH regulating unit 240 may additionally be included between the impurity removal step and the compression step using the compression unit 300. Furthermore, referring to FIG. 6, in the solar boat panel cleaning method that compresses water introduced during operation to use the compressed water as cleaning water according to an embodiment of the present disclosure, the step in which the salinity of the water from which impurities are removed is measured by the salinity measuring unit 210 and regulated by the salinity regulating unit 220 and the step in which the pH of the water from which impurities are removed is measured by the pH measuring unit 230 and regulated by the pH regulating unit 240 may additionally be included between the impurity removal step and the compression step using the compression unit 300.

Figure 7:
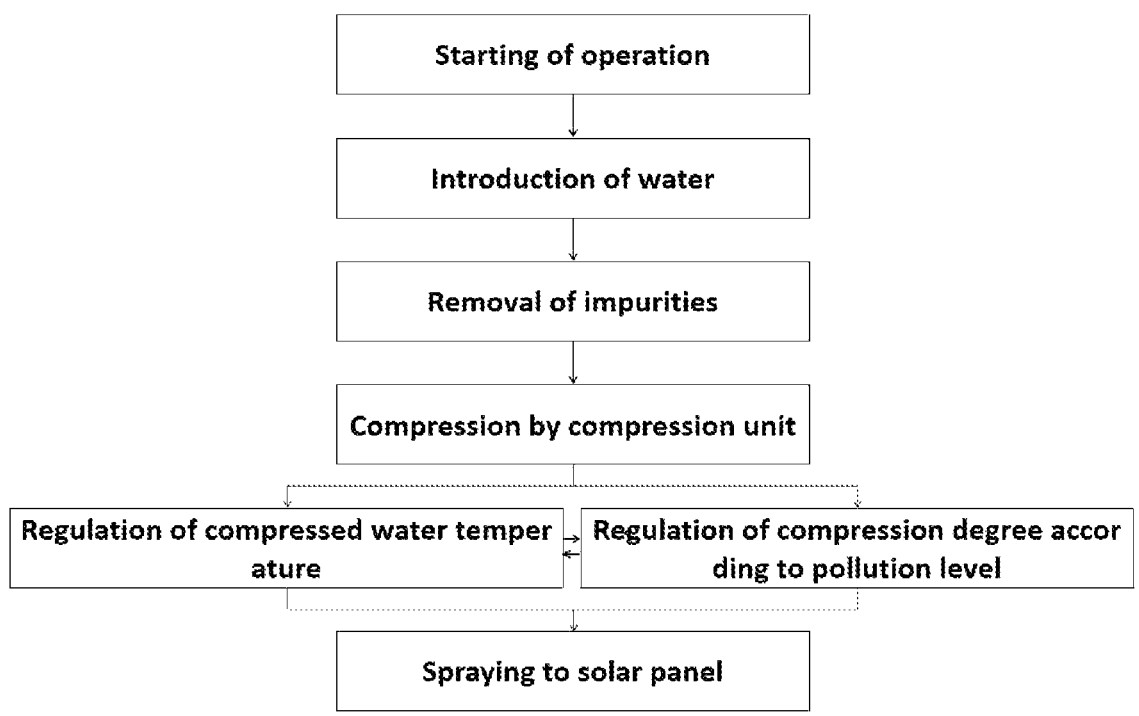
FIG. 7 is a flowchart illustrating a solar boat panel cleaning method that compresses water introduced during operation to use the compressed water as cleaning water, the method further including one or more of a temperature regulating step and a compression regulating step, according to an embodiment of the present disclosure.

FIG. 7 is a flowchart illustrating a solar boat panel cleaning method that compresses water introduced during operation to use the compressed water as cleaning water, the method further including one or more of a temperature regulating step and a compression regulating step, according to an embodiment of the present disclosure.

Referring to FIG. 7, in the solar boat panel cleaning method that compresses water introduced during operation to use the compressed water as cleaning water according to an embodiment of the present disclosure, a step in which the temperature of the compressed water is measured by a temperature measuring unit 310 and regulated by a temperature regulating unit 320 may additionally be included between the compression step using the compression unit 300 and the step of spraying the water to the solar panel 410.

In addition, referring to FIG. 7, in the solar boat panel cleaning method that compresses water introduced during operation to use the compressed water as cleaning water according to an embodiment of the present disclosure, a step in which the pollution level of the solar panel 410 is measured by the pollution measuring unit 420 and the degree of compression is regulated by the compression regulating unit 330 according to the pollution level may additionally be included between the compression step using the compression unit 300 and the step of spraying the water to the solar panel 410. Furthermore, referring to FIG. 7, in the solar boat panel cleaning method that compresses water introduced during operation to use the compressed water as cleaning water according to an embodiment of the present disclosure, the step in which the temperature of the compressed water is measured by the temperature measuring unit 310 and regulated by the temperature regulating unit 320 and the step in which the pollution level of the solar panel 410 is measured by the pollution measuring unit 420 and the degree of compression is regulated by the compression regulating unit 330 according to the pollution level may additionally be included between the compression step using the compression unit 300 and the step of spraying the water to the solar panel 410.

As described above, while the present disclosure has been described with reference to the embodiments illustrated in the drawings, it should be understood that described embodiments are merely exemplary embodiments, and various modifications and equivalent other embodiments are possible based on common knowledge in the field to which the art pertains. Therefore, the true technical protection scope of the present disclosure depends on the claims to be described below, and should be determined based on the specific content of the above-described invention.

INDUSTRIAL APPLICABILITY

The present disclosure relates to a device and solar boat panel cleaning method using, as cleaning water, inflow water introduced and compressed during operation of the solar boat, and is applicable to an industrial field for cleaning a solar panel.

What is claimed is:

1. A device for cleaning a solar panel of a solar boat using, as cleaning water, water externally introduced and compressed during operation of the solar boat, the device comprising:
   a water inlet port disposed on the front side of the solar boat;
   a filtration unit removing impurities from water introduced through the water inlet port during operation of the solar boat;
   a compression unit compressing impurities-removed water; and
   a spray nozzle spraying the compressed water to the solar panel,
   wherein the filtration unit further includes a salinity measuring unit measuring the salinity of the impurities-removed water, and a salinity regulating unit regulating the salinity of the impurities-removed water.

2. The device of claim 1, wherein the water inlet port is further provided with an opening/closing unit that is opened only when cleaning is required.

3. A device for cleaning a solar panel of a solar boat using, as cleaning water, water externally introduced and compressed during operation of the solar boat, the device comprising:
   a water inlet port disposed on the front side of the solar boat;
   a filtration unit removing impurities from water introduced through the water inlet port during operation of the solar boat;
   a compression unit compressing impurities-removed water; and
   a spray nozzle spraying the compressed water to the solar panel,
   wherein the filtration unit further includes a pH measuring unit measuring the pH of the impurities-removed water, and a pH regulating unit regulating the pH of the impurities-removed water.

4. A device for cleaning a solar panel of a solar boat using, as cleaning water, water externally introduced and compressed during operation of the solar boat, the device comprising:
   a water inlet port disposed on the front side of the solar boat;
   a filtration unit removing impurities from water introduced through the water inlet port during operation of the solar boat;
   a compression unit compressing impurities-removed water; and
   a spray nozzle spraying the compressed water to the solar panel,
   wherein the compression unit further includes a temperature measuring unit measuring the temperature of the compressed water, and a temperature regulating unit regulating the temperature of the compressed water.

5. The device of claim 1, wherein the solar panel further includes a pollution measuring unit measuring the pollution level, and the compression unit further includes a compression regulating unit regulating the degree of compression according to the measured pollution level.

6. The device of claim 1, wherein the solar panel has a downward slope formed in the direction in which the spray nozzle sprays compressed water.

* * * * *